E. H. JONES.
WELDING AND BRAZING.
APPLICATION FILED SEPT. 18, 1918.
1,387,157.
Patented Aug. 9, 1921.
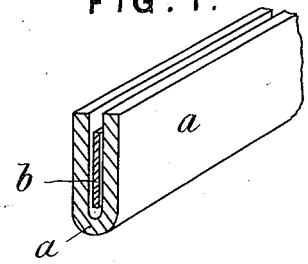
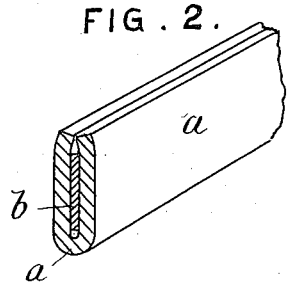
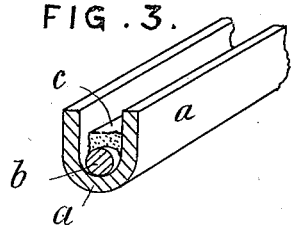
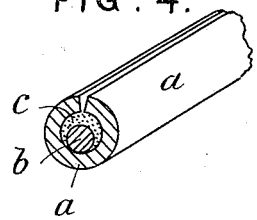
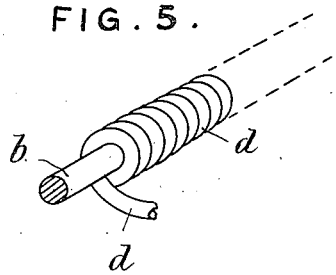
INVENTOR:
Ernest Henry Jones
BY Wm Wallace White
ATT'Y.

UNITED STATES PATENT OFFICE.

ERNEST HENRY JONES, OF CANONBURY, LONDON, ENGLAND.

WELDING AND BRAZING.

1,387,157.  Specification of Letters Patent.  Patented Aug. 9, 1921.

Application filed September 18, 1918. Serial No. 254,568.

*To all whom it may concern:*

Be it known that I, ERNEST HENRY JONES, a subject of the King of Great Britain, residing at 4 Grange road, Canonbury, London, England, have invented new and useful Improvements in Welding and Brazing, of which the following is a specification.

This invention relates to welding and brazing rods which are used with an oxy-acetylene or other blow pipe and has for its object improvements whereby the weld or joint may be effected with greater celerity and efficiency than heretofore.

According to this invention, the welding rod is constructed or composed of all the materials necessary to produce under the heat of the blow pipe the requisite metal or alloy for the purpose intended.

With this object a metal base, such as mild steel or cast iron, or brass or gunmetal in the form of a rod, tube, or channel, is electroplated with and has secured therein another metal or a combination of other metals or alloys so that the welding rod under the influence of the heat of the blow pipe deposits the required metal or alloy to suit the weld or joint. In the case of steel or iron the surface of the rod or the tube may be casehardened to provide an additional amount of carbon.

For example, a mild steel rod which has been electroplated with nickel when used as a welding rod produces a metal weld or joint of a greater tensile strength than if a nickel steel welding rod had been employed, and has the further advantage that the molten metal flows more freely and settles with greater density than does nickel steel under similar conditions.

Again: all the materials necessary for the depositing of what is known as "high speed steel" may be combined in a welding rod; for example, a channel section mild steel welding rod with a carbon of cast iron content, and a suitable proportion of vanadium, cobalt, tungsten, molybdenum, chromium, aluminium, or the like may be employed for depositing metal on the cutting parts of tools, dies and the like.

The accompanying drawings illustrate various examples of construction whereby one or more metals or alloys may be secured in the base in accordance with this invention.

Figures 1 and 2 illustrate a channel section base *a* containing a strip *b* of a metal or alloy, Fig. 2 representing the rod after it has been subjected to pressure in order to secure the strip in position.

Figs. 3 and 4 illustrate a channel section base *a* containing a wire *b* of a metal or alloy and a filling *c* of more or less rare metals in powder or paste form, Fig. 4 representing the rod after it has been subjected to pressure to secure the contents.

Fig. 5 illustrates a wire or ribbon base *d* wound (in close or open spirals) upon a wire *b* of a metal or alloy.

It is advantageous to inclose the metal or alloy within the base, as illustrated by way of example in the accompanying drawings, as by so doing the metal or alloy is protected and does not burn away uselessly. These remarks, however, do not apply to electro-plated rods which I find quite satisfactory.

I claim:—

1. In combination, a hollow member formed of a basic metal, an alloy and a welding mixture secured within said member.

2. A solder formed of an alloy, a welding mixture, and a member formed of a basic metal bent to inclose and secure the alloy and welding mixture within the member.

3. A solder formed of an alloy, and a basic metal member wound around said alloy in the form of a coil.

In testimony whereof I have signed my name to this specification.

ERNEST HENRY JONES.